No. 871,328. PATENTED NOV. 19, 1907.
W. J. DOWNS.
CORN PLANTER AND FERTILIZER DROPPER.
APPLICATION FILED JAN. 31, 1907.
3 SHEETS—SHEET 2.
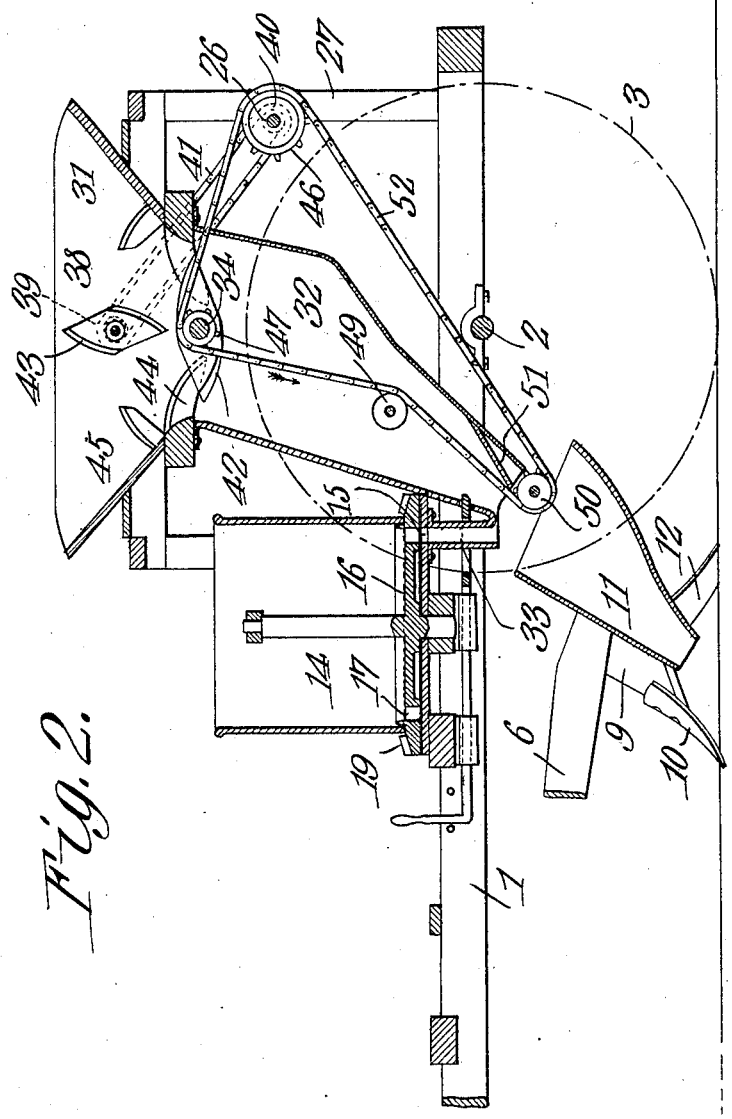
WITNESSES:
William J. Downs,
INVENTOR.
By C. A. Snow & Co.
ATTORNEYS

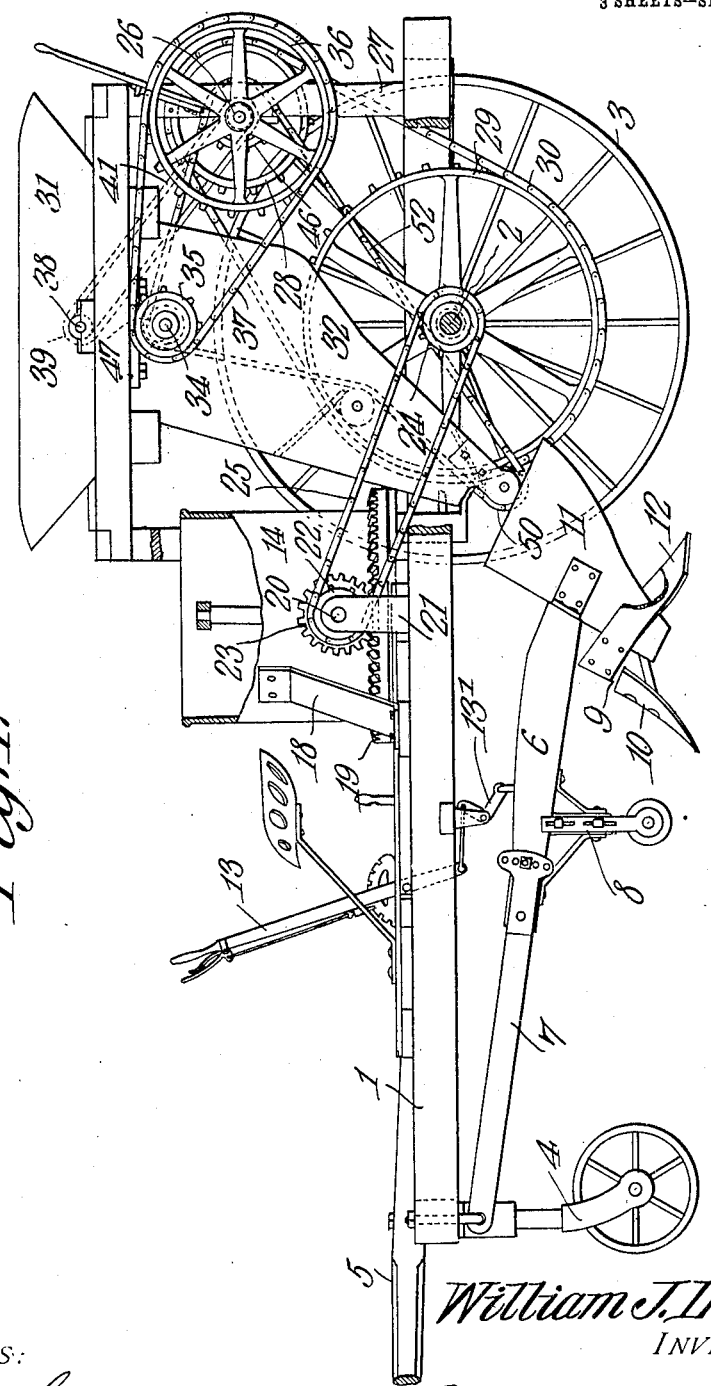

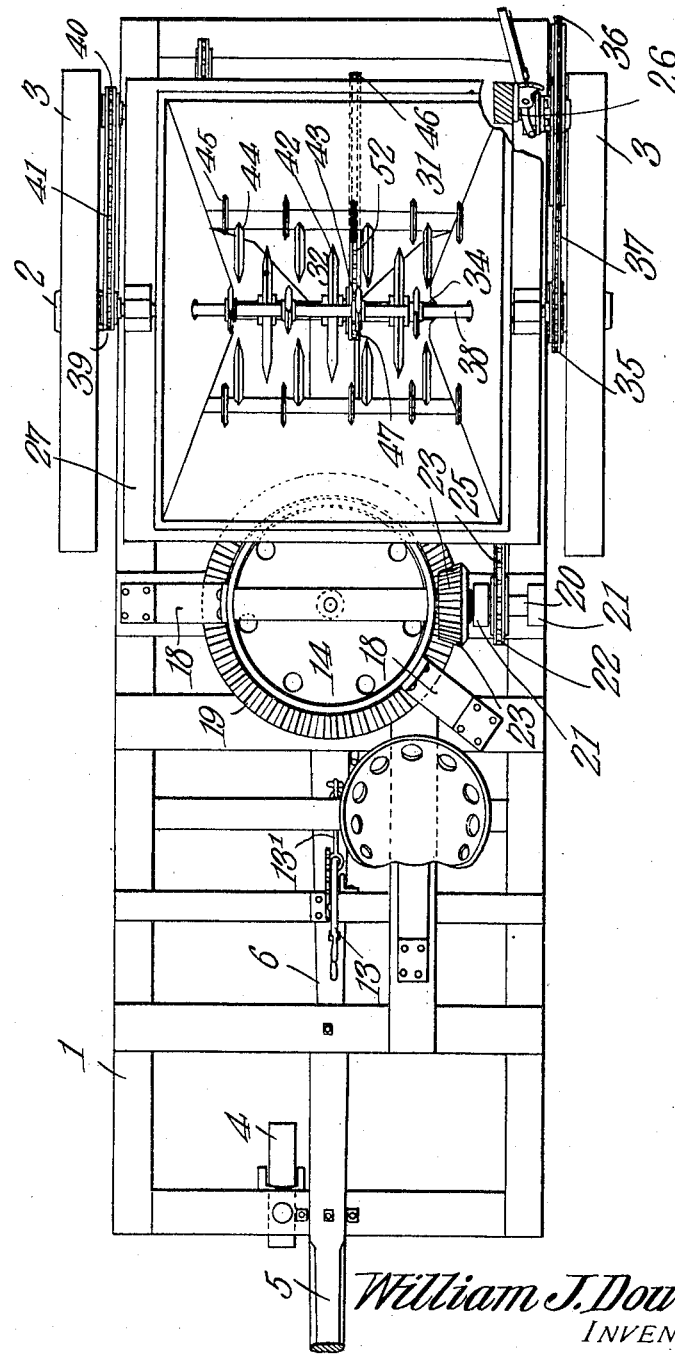

UNITED STATES PATENT OFFICE.

WILLIAM J. DOWNS, OF FRAGRANT, KENTUCKY.

CORN-PLANTER AND FERTILIZER-DROPPER.

No. 871,328.　　　Specification of Letters Patent.　　　Patented Nov. 19, 1907.

Application filed January 31, 1907. Serial No. 355,118.

*To all whom it may concern:*

Be it known that I, WILLIAM J. DOWNS, a citizen of the United States, residing at Fragrant, in the county of Grayson and State of Kentucky, have invented a new and useful Corn-Planter and Fertilizer-Dropper, of which the following is a specification.

This invention has relation to combined corn planters and fertilizer droppers and it consists in the novel construction and arrangement of its parts as hereinafter shown and described.

The object of the invention is to provide an implement of the character indicated which is adapted to open a furrow in the ground, deposit seed at regular intervals in said furrow, also drop fertilizer in the furrow and then cover the seed and fertilizer.

The mechanism for separating the individual grains of corn from the bulk of grain is operated through connections with traction wheels which support the implement and the means for dropping the fertilizer is also operated by connections with said traction wheels as is also a device provided for macerating the fertilizer. The fertilizing material may be either compost or bone dust or a mixture of such material.

In the accompanying drawing:—Figure 1 is a side elevation of the implement. Fig. 2 is a vertical sectional view of the same, and Fig. 3 is a top plan view of the same.

The implement comprises the frame 1 which is mounted upon the axle 2. The traction wheels 3 are fixed to the ends of the axle 2 and rotate with the same. The forward portion of the frame 1 is supported by the caster wheel 4. The tongue 5 is attached at its rear end to said frame. The beam 6 is attached at its forward end to the draft bar 7, the forward end of which is swiveled to the forward end of the frame 1. The colter arm and wheel 8 is attached to the beam 6 as is also the standard 9. The plow point 10 is fixed to the lower end of said standard and is adapted to open a furrow in the ground. The funnel shaped boot 11 is attached to the rear end of the beam 6 and the lower end of said boot terminates just behind the plow point 10. The cover arms 12 are attached at their forward ends to the standard 9 and have their rear ends disposed behind the lower end of the boot 11 and pitched at such an angle as to throw the earth into the furrow opened by the plow 10 as the implement passes over the surface of the ground. The lever 13 is fulcrumed to the frame 1 and its working end is connected by means of a link 13' with the beam 6. By the manipulation of the said lever it is obvious that the said beam 6 together with its attachments may be raised or lowered. The seed box 14 rests upon the frame 1 and has in its bottom an opening 15. The feed disk or plate 16 is journaled for rotation in the box 14 and is provided with a series of openings 17 which are adapted to successively register with the opening 15. The edge of the plate 16 projects beyond the vertical sides of the box 14 which is held against rotation by the braces 18. The edge of the said plate 16 is provided with the gear teeth 19 which are arranged in the form of a circle. The stub shaft 20 is journaled in bearings provided in the posts 21 and the sprocket wheel 22 is fixed to said shaft. The gear wheel 23 is also fixed to the said shaft 20 and meshes with the gear 19. The sprocket wheel 24 is fixed to the axle 2 and the sprocket chain 25 passes around the wheels 22 and 24. The shaft 26 is journaled at the rear end of the superstructure 27 which is mounted upon the rear portion of the frame 1. Said shaft 26 extends transversely of the superstructure 27. The sprocket wheel 28 is fixed to the shaft 26 and the sprocket wheel 29 is fixed to the axle 2. The sprocket chain 30 passes around the sprocket wheels 28 and 29 and transmit rotary motion from the latter to the former. The hopper 31 is supported by the superstructure 27 and is provided with a chute 32, the lower end of which terminates adjacent the lower end of the tube 33. The upper end of said tube is attached to the bottom of the seed box 14 at the opening 15 thereof. The lower ends of the chute 32 and the tube 33 deliver to the upper end of the boot 11. The shaft 34 is journaled in the hopper 31. The sprocket wheel 35 is fixed to said shaft 34. The sprocket wheel 36 is fixed to the shaft 26 and the sprocket chain 37 passes around the sprocket wheels 35 and 36 and transmit rotary movement from the latter to the former. The shaft 38 is journaled in the upper portion of the hopper 31. The sprocket wheel 39 is fixed to the shaft 38 and the sprocket wheel 40 is fixed to the shaft 26. The sprocket chain 41 passes around the sprocket wheels 39 and 40 and transmits rotary movement from the latter to the former. The radially disposed knives or blades 42 and 43 are mounted upon the shafts 34 and 38 respectively. The fixed blades 44 and 45 are attached to the hopper 31 and coöperate with the blades 42 and 43 respectively in macerating the contents of the hopper 31. The sprocket wheel 46 is fixed to the shaft 26. The sprocket wheel 47 is loosely mounted upon the shaft 34. The sprocket wheel 49 is arranged in the chute 32 and the sprocket wheel 50 is journaled at the lower end of the chute 32 and is covered by the shield 51. The sprocket chain 52 passes around the wheels 46, 47, 49 and 50 and is actuated by the wheel 46.

From the foregoing description it is obvious that as the implement is drawn along the surface of the ground that seed from the box 14 will be passed at intervals through the openings 17 of the plate 16 through the openings 15 and tube 33 into the boot 11 from the lower end of which it will be deposited in the furrow prior to its closing as above described. At the same time the rotating blades 42 and 43 will macerate the contents of the hopper 31 which will be drawn down by the chain 52 through the chute 32 and deposited into the boot 11. The said fertilizer will thus be dropped into the soil. By reason of the fact that the beam 6 is joined with the frame 1 by a swivel connection and that the boot 11 is not positively connected with the chute 33 and tube 32 the said beam may shift laterally in case the plow point 10 comes in contact with an obstruction and also the said beam may rise and fall in passing over uneven ground in order that the seed may be deposited at uniform depth below the surface thereof.

Having described my invention what I claim as new and desire to secure by Letters-Patent is:—

An implement of the character indicated comprising a frame mounted upon an axle, a superposed hopper mounted upon the frame, a plurality of shafts journaled within the hopper and being operatively connected with the axle to rotate at different rates of speed, macerators carried by the shafts, blades mounted upon the inner sides of the hopper, and a chain actuated by the axle and passing through the hopper and chute thereof.

In testimony that I claim the foregoing as my own, I have hereto affixed my signature in the presence of two witnesses.

WILLIAM J. DOWNS.

Witnesses:
H. W. NELSON,
T. J. SKAGGS.